(12) United States Patent
Graham

(10) Patent No.: US 8,715,500 B2
(45) Date of Patent: May 6, 2014

(54) FLOW DISTRIBUTOR PLATE FOR THE TREATMENT OF WATER BY REVERSE OSMOSIS

(76) Inventor: William Graham, Gordon's Bay (ZA)

( * ) Notice: Subject to any disclaimer, the term of this patent is extended or adjusted under 35 U.S.C. 154(b) by 529 days.

(21) Appl. No.: 12/812,870

(22) PCT Filed: Oct. 29, 2008

(86) PCT No.: PCT/IB2008/054465
§ 371 (c)(1),
(2), (4) Date: Aug. 23, 2010

(87) PCT Pub. No.: WO2009/090510
PCT Pub. Date: Jul. 23, 2009

(65) Prior Publication Data
US 2010/0326900 A1   Dec. 30, 2010

(30) Foreign Application Priority Data
Jan. 16, 2008  (GB) .................................. 0800774.2

(51) Int. Cl.
*B01D 65/00* (2006.01)
*B01D 63/00* (2006.01)
*B01D 63/12* (2006.01)
*C02F 1/44* (2006.01)

(52) U.S. Cl.
USPC ........ 210/232; 210/240; 210/321.6; 210/456; 210/498

(58) Field of Classification Search
USPC .................................. 210/232, 240, 456, 498
See application file for complete search history.

(56) References Cited

U.S. PATENT DOCUMENTS 4,202,772 A * 5/1980 Goldstein ..................... 210/232
2005/0057002 A1   3/2005 Chikura et al.

FOREIGN PATENT DOCUMENTS

JP   2001-224931 A   8/2001
WO   WO-00/57994 A2   10/2000

* cited by examiner

*Primary Examiner* — John Kim
(74) *Attorney, Agent, or Firm* — Novak Druce Connolly Bove + Quigg LLP

(57) ABSTRACT

In a reverse osmosis desalination plant a number of membranes (34, 36, 38, 40) are arranged end-to-end in a cylindrical outer casing (42). Each membrane comprises a sleeve, a permeate pipe (56) passing centrally through the sleeve, a plurality of leaves of permeable material (54) wound around the pipe and contained within the sleeve and an apertured plate (10, 58) at each end of the sleeve. According to the invention the flow distributor plate (10) at the inlet end of each membrane is a flow distributor and has a plurality of bores (30.1, 30.2 etc) through it from a front face (12) to a rear face (14). The front face (12) has a recessed area (20) which is set back from the remainder (22) of the front face (12). The entrances to at least some of the bores (30.1, 30.2 etc) are within the recessed area (20).

20 Claims, 3 Drawing Sheets

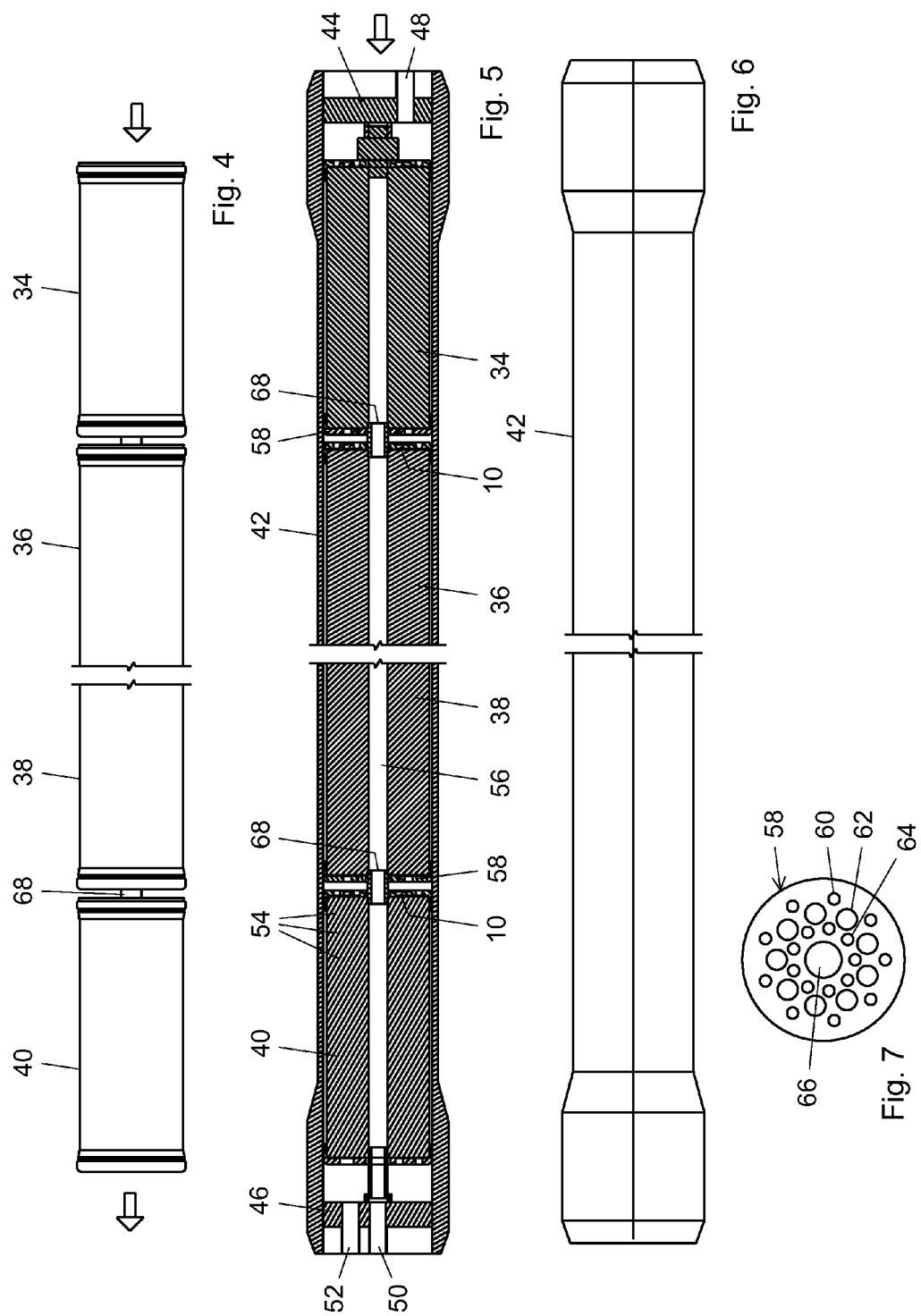

FLOW DISTRIBUTOR PLATE FOR THE TREATMENT OF WATER BY REVERSE OSMOSIS

CROSS REFERENCE TO RELATED APPLICATIONS

This application is a National Phase filing under 35 U.S.C. §371 of PCT/IB2008/054465 filed on Oct. 29, 1008; and this application claims priority to Application No. 0800774.2 filed in United Kingdom on Jan. 16, 2008 under 35 U.S.C. §119; the entire contents of all are hereby incorporated by reference.

FIELD OF THE INVENTION

THIS INVENTION relates to the treatment of water by reverse osmosis.

BACKGROUND TO THE INVENTION

In PCT application PCT/GB96/03060 (published as WO 97/21630) there is disclosed desalination apparatus which includes a series of spirally wound reverse osmosis membranes in a cylindrical outer casing. The casing has a cap at each end. The caps close the ends of the casing. The raw water inlet, the permeate outlet and the brine outlet pass through the caps.

Between the cap through which the raw water inlet passes and the adjacent end of the first of the membranes in the casing there is a flow distributor plate. The plate has a multitude of bores passing through it and streams of raw water flow through these bores. The water streams impinge on the end of the first membrane and the water flows into the salt retention passages.

The flow distributor plate of the desalinator disclosed in WO 97/21630 has a flat front face and the bores in the plate can have their axes skew to the flat front face of the plate.

The present invention provides an improved flow distributor plate for reverse osmosis desalination apparatus.

BRIEF DESCRIPTION OF THE INVENTION

According to one aspect of the present invention there is provided a flow distributor plate for a reverse osmosis desalination apparatus, the plate having a plurality of bores through it from a front face thereof to a rear face thereof, the front face having a recessed area the surface of which is set back from the remainder of the front face of the plate, the entrances to at least some of the bores being within said recessed area.

In one form there is a plurality of recesses together making up the recessed area, there being the entrance to at least one bore within each recessed area. Each of said plurality of recesses can encircle a single bore entrance. In another form there are two or more bore entrances in each recess.

Some of the bores can straddle the bounding edges of the recesses so that a first part of the entrance of each of these bores is within the recessed area and the second part of the entrance of each of these bores is outside said area.

In a specific form there is a circular array of recesses, each recess being circular and adjacent recesses being joined by a recessed channel, the recesses and channels forming the recessed area. The channels can be of the same depth as the recesses.

The width of each channel can be less than the diameter of each bore and there can be at a least one bore having its entrance in each channel, a centre part of the entrance to each of these bores being in the channel and two opposed peripheral parts of each of these bores being outside the channel.

BRIEF DESCRIPTION OF THE DRAWINGS

For a better understanding of the present invention, and to show how the same may be carried into effect, reference will now be made, by way of example, to the accompanying drawings in which:

FIG. 4 illustrates three membranes in an end-to-end array;

FIG. 5 is a section through the membrane array of FIG. 4 and also shows a casing;

FIG. 6 is an elevation of the casing shown in FIG. 5; and

FIG. 7 is an elevation of the flow distributor plate through which water emerging from the salt retention passages flows.

DETAILED DESCRIPTION OF THE DRAWINGS

Figure 1:
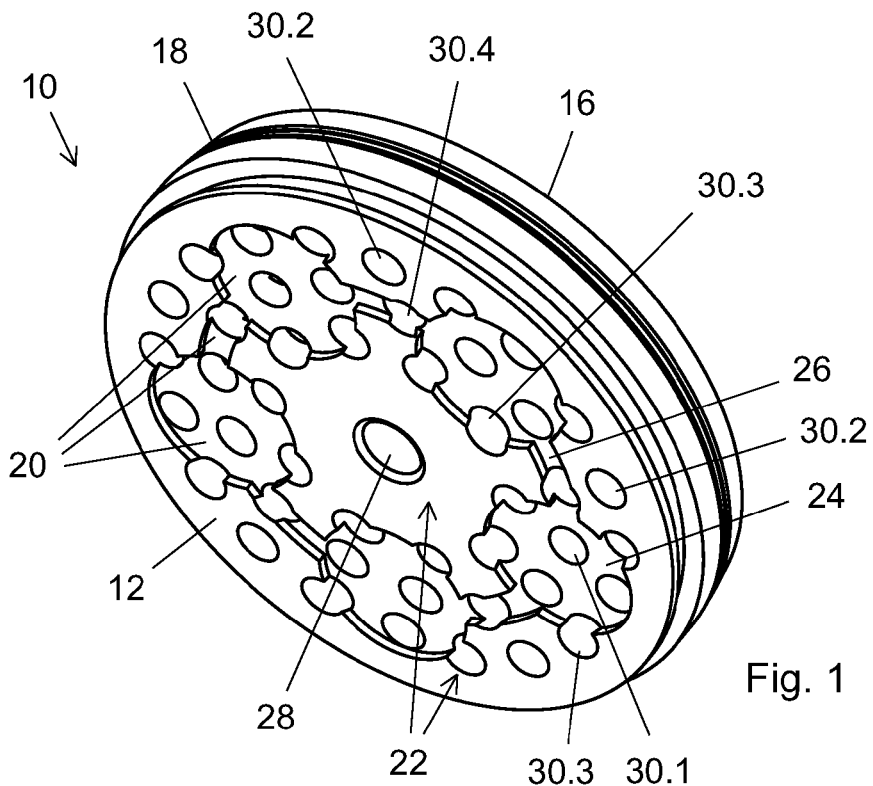
FIGS. 1 and 2 are respectively pictorial views of the front and rear faces of a flow distributor plate in accordance with the present invention.
Figure 2:
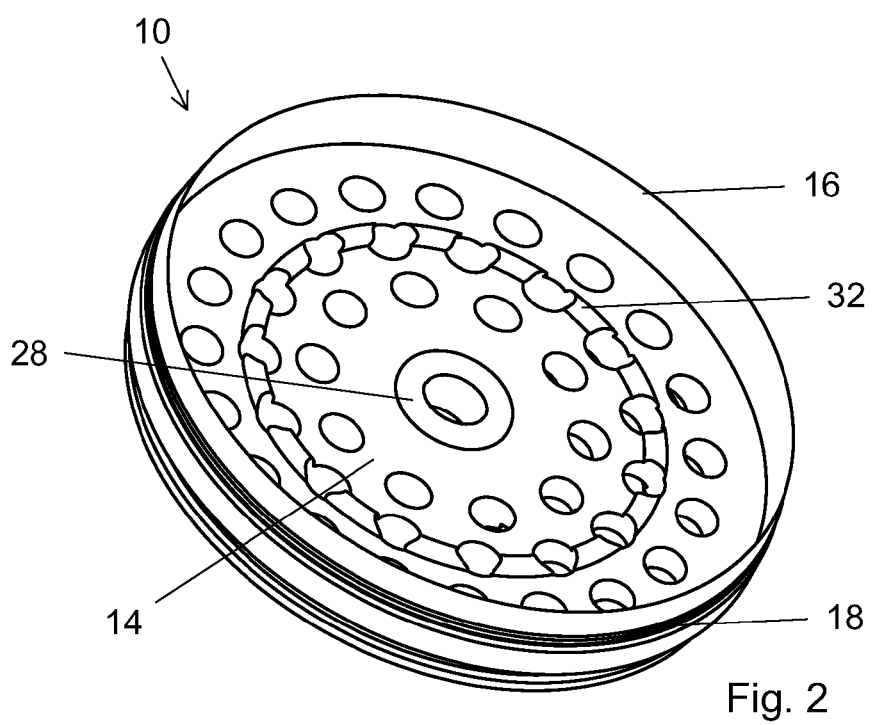
Figure 3:
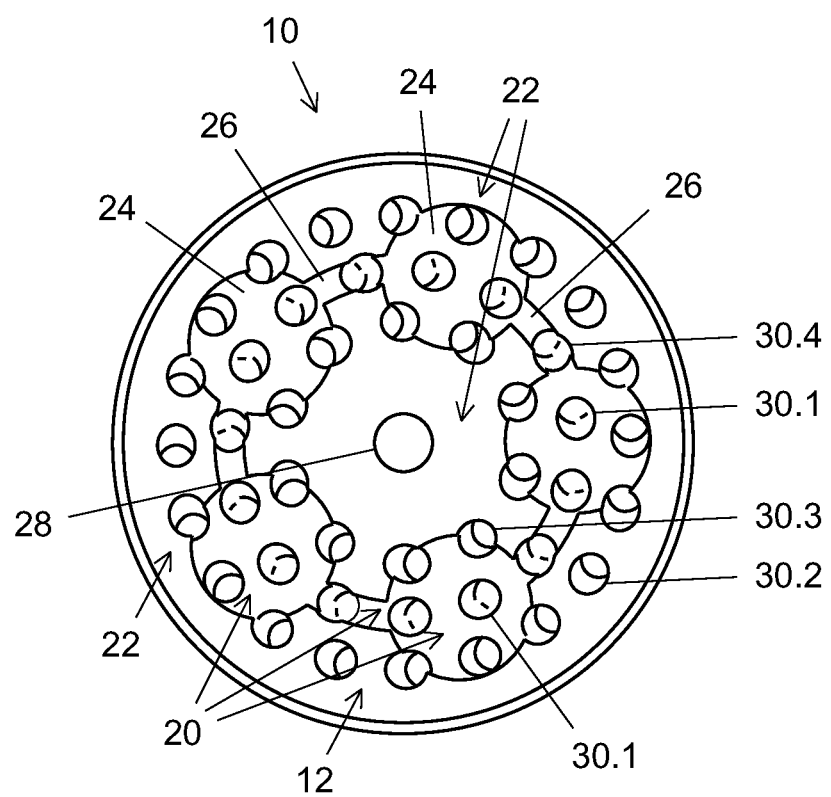
FIG. 3 is an elevation of the front face of the plate of FIGS. 1 and 2.

The flow distributor plate shown in FIGS. 1 to 3 of the drawings is designated 10 and has a front face 12 (FIGS. 1 and 3) and a rear face 14 (FIG. 2).

An encircling spigot 16 protrudes from the rear face 14 and has, on the cylindrical outer face thereof, formations 18 which enable it to be fitted in a leakproof manner into one end of the cylindrical casing (not shown) which receives the spirally wound reverse osmosis membranes.

The front surface of the plate consists of a recessed area 20 which is set back from the remainder of the front surface of the plate. The remainder of the front surface of the plate is designated 22 and comprises the entire area of the plate which is not recessed and setback.

The recessed area 20 is constituted by an array of circular recesses 24 and a series of channels 26. The recesses 24 are arranged in a circular array around the axis of the plate 10, which axis passes through the centre of an opening 28 at the centre of the plate 10. Channels 26 are arcuate in shape and generated about said axis. Each channel 26 joins two circular recesses 24. The permeate outlet pipe (not shown) passes through the opening 28.

Bores 30.1, 30.2, 30.3 and 30.4 pass through the plate 10. Each bore In the plate is skew in that its longitudinal axis is not at right angles to the surfaces of the plate. This means that the entrance to each bore is displaced circumferentially around the plate from its exit.

In the illustrated embodiment the bores can be considered to fall into Four groups. The bores of the first group are designated 30.1 and each bore in this group lies wholly within one of the recesses 24. The second group of bores is designated 30.2 and each bore in this group lies wholly within the area 22. The remaining groups of bores, designated 30.3 and 30.4, straddle the areas 20, 22 and hence each has part of its entrance within the area 20 and part within the area 22. Some bores in this group, those designated 30.3, straddle the edge of a circular recess 24. The remainder, those designated 30.4, are each co-incident with a channel 26. As the diameter of each bore 30.4 is greater than the width of the channel 26, a centre part of each entrance is in the channel and two opposed peripheral parts are outside the channel and in the area 22.

A raised ring 32 is provided on the rear face 14 of the plate 10.

Turning now to FIGS. 4 and 5, reference numerals 34, 36, 38 and 40 designate four membranes in an end-to-end array.

The outer casing in which the membrane array is contained is shown in FIGS. 5 and 6 and is designated 42. The end caps 44, 46 which close-off both ends of the casing 42 and the pipes 48, 50 and 52 through which raw water, permeate and waste water flows are only illustrated in FIG. 5. The water being treated flows through membranes 34, 36, 38 and 40 in sequence.

Each membrane includes semi-permeable leaves 54 which are wrapped around a permeate pipe 56 in conventional manner.

At the inlet end of each membrane there is a flow distributor plate 10 as shown in FIGS. 1 to 3. At the outlet end of each membrane there is a flow distributor plate 58 (FIG. 7). The plates 10 and 58 are at opposite ends of a sleeve which sheaths the array of leaves 54.

The plate 58 has three co-axial rings of bores 60, 62 and 64 in it, the bores 62 in the middle ring being larger than those in the inner and outer rings 60, 64. In addition there is a central opening 66 which matches the opening 28 in the plate 10.

As seen in FIGS. 4 and 5, there are short pipes 68 which pass through the openings 28 and 66 and connect the permeate pipes 56 in series. The plate 58 at the outlet end of each membrane is spaced from the plate 10 at the inlet end of the next membrane in the array. Water emerging under pressure from each of the membranes 34, 36, 38 through the bores 60, 62 and 64 does so as a series of streams of water which impinge on the plate 10 of the next membrane in the series. The water entering the recessed area 20 in particular has turbulence imparted to it and turbulent streams flow through the bores 30.1, 30.2 etc onto the end of the membrane 36, 38, 40. The angle of the bores 30.1, 30.2 etc imparts a swirling motion to the water which impinges on the end of the membrane. The direction in which the water is caused to swirl is the same as that in which the leaves 54 are wound around the pipe 56.

Experimental work has shown that recessing the front face of the plate 10, and providing the entrances to some of the bores in the plate within the recessed area, enhances the performance of the desalinator. Applicant attributes this enhanced performance to the fact that turbulent water flows into the salt retention passages of each membrane after the first and that the area of the membrane which can be considered as a deadspot is minimised.

The invention claimed is:

1. A flow distributor plate for a reverse osmosis desalination apparatus, the plate having a plurality of bores through it from a front face thereof to a rear face thereof, the front face having a recessed area the surface of which is set back from the remainder of the front face of the plate, the entrances to some of the bores being within said recessed area, and the entrances to other of the bores being within said remainder of the front face.

2. A flow distributor plate as claimed in claim 1, wherein a plurality of recesses together make up the recessed area, there being the entrance to at least one bore within each recess.

3. A flow distributor plate as claimed in claim 1, wherein each of said plurality of recesses encircles a single bore entrance.

4. A flow distributor plate as claimed in claim 2, wherein there are two or more bore entrances in each recess.

5. A flow distributor plate as claimed in claim 1, wherein some of the bores straddle the bounding edges of the recessed area so that a first part of the entrance of each of these bores is within the recessed area and the second part of the entrance of each of these bores is outside said area.

6. A flow distributor plate as claimed in claim 1, having an array of recesses arranged in a circle, each recess being circular and adjacent recesses being joined by a recessed channel, the recesses and channels forming the recessed area.

7. A flow distributor plate as claimed in claim 6, wherein the channels are of the same depth as the recesses.

8. A flow distributor plate as claimed in claim 6, wherein the width of each channel is less than the diameter of each bore and there is at least one bore having its entrance in each channel, a centre part of the entrance to each of these bores being in the channel and two opposed peripheral parts of each of these bores being outside the channel.

9. A flow distributor plate as claimed in claim 1, wherein each bore in the plate is skew, the arrangement of each bore being such that its entrance is displaced circumferentially around the plate from its exit.

10. A desalination installation comprising a plurality of membranes arranged end-to-end in an outer casing, each membrane from the second onwards having at the inlet end thereof a flow distributor plate as claimed in claim 1.

11. An installation as claimed in claim 10, wherein each membrane has a flow distributor plate at the outlet end thereof, the flow distributor plate at the outlet end of each membrane having bores in it from which water emerging from the salt retention passages flow and there being a gap between the flow distributor plate at the outlet end of one membrane and the flow distributor plate at the inlet end of the next membrane.

12. A flow distributor plate as claimed in claim 2, having an array of recesses arranged in a circle, each recess being circular and adjacent recesses being joined by a recessed channel, the recesses and channels forming the recessed area.

13. A flow distributor plate as claimed in claim 3, having an array of recesses arranged in a circle, each recess being circular and adjacent recesses being joined by a recessed channel, the recesses and channels forming the recessed area.

14. A flow distributor plate as claimed in claim 4, having an array of recesses arranged in a circle, each recess being circular and adjacent recesses being joined by a recessed channel, the recesses and channels forming the recessed area.

15. A flow distributor plate as claimed in claim 5, having an array of recesses arranged in a circle, each recess being circular and adjacent recesses being joined by a recessed channel, the recesses and channels forming the recessed area.

16. A flow distributor plate as claimed in claim 7, wherein the width of each channel is less than the diameter of each bore and there is at least one bore having its entrance in each channel, a centre part of the entrance to each of these bores being in the channel and two opposed peripheral parts of each of these bores being outside the channel.

17. A flow distributor plate as claimed in claim 2, wherein each bore in the plate is skew, the arrangement of each bore being such that its entrance is displaced circumferentially around the plate from its exit.

18. A flow distributor plate as claimed in claim 3, wherein each bore in the plate is skew, the arrangement of each bore being such that its entrance is displaced circumferentially around the plate from its exit.

19. A flow distributor plate as claimed in claim 4, wherein each bore in the plate is skew, the arrangement of each bore being such that its entrance is displaced circumferentially around the plate from its exit.

20. A flow distributor plate as claimed in claim 5, wherein each bore in the plate is skew, the arrangement of each bore being such that its entrance is displaced circumferentially around the plate from its exit.

* * * * *